Figure 1:
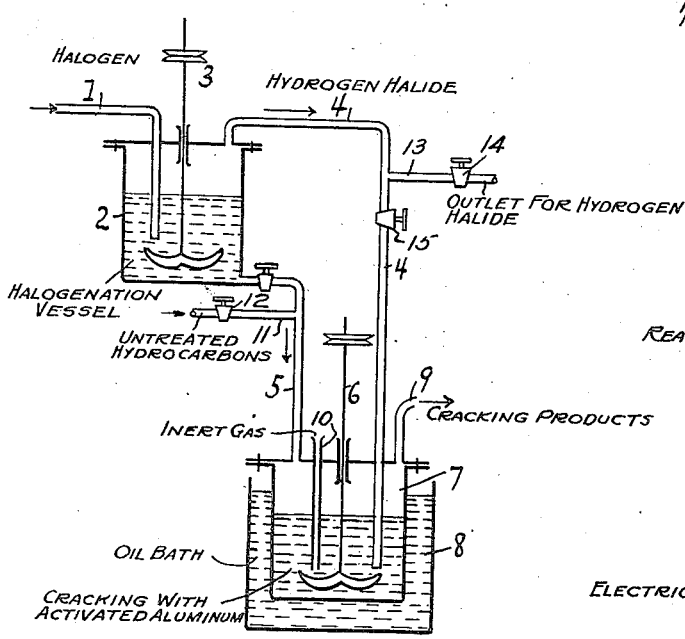

Jan. 2, 1934.  H. ENGEL ET AL  1,941,884
CONVERSION OF HYDROCARBONS INTO THOSE OF LOWER BOILING POINT
Filed Aug. 1, 1930

Hans Engel
Josef Jannek
INVENTORS

BY
ATTORNEYS

Patented Jan. 2, 1934

1,941,884

UNITED STATES PATENT OFFICE 1,941,884

CONVERSION OF HYDROCARBONS INTO THOSE OF LOWER BOILING POINT

Hans Engel, Mannheim, and Josef Jannek, Ludwigshafen-on-the-Rhine, Germany, assignors to I. G. Farbenindustrie Aktiengesellschaft, Frankfort-on-the-Main, Germany Application August 1, 1930, Serial No. 472,308, and in Germany August 5, 1929

13 Claims. (Cl. 196—54)

The present invention relates to the conversion of hydrocarbons into those of lower boiling point.

It is already known that aluminium chloride is a good catalyst for splitting hydrocarbons. It has also been proposed to employ in the place of aluminium chloride, aluminium in an activated state and hydrogen halides. This method, as a rule, requires comparatively large amounts of hydrogen halides, as for example about 12 per cent of hydrogen chloride when adding 3 per cent of aluminium.

We have now found that for splitting liquid or solid hydrocarbons it is advantageous to subject them to the action of free halogen and then to the action of aluminium activated by treating it with a solution of a salt of a metal, which is less electropositive than aluminium and which is consequently deposited thereon. When the term "activated aluminium" is hereinafter used it is intended to mean aluminium activated as hereinbefore defined. According to the present invention the hydrocarbons of high boiling point, for example tars, middle oils or other hydrocarbons boiling above 200° C. are first treated, preferably under atmospheric pressure and at temperatures ranging from 0° to about 150° C., with free halogen, considerable amounts of hydrogen halide being set free, of which a smaller or larger amount remains dissolved according to the temperature employed. By hydrocarbons of high boiling point are hereinafter meant those boiling above 200° C. The resulting product is then exposed to the action of activated aluminium at temperatures between about 100° and 500° C., preferably between 150° and 250° C., gases or vapors, which do not take part in the reaction, as for example nitrogen, being supplied if desired. The cracked products may be freed from halogen by washing with soda or caustic soda solution or the like. The hydrocarbons of lower boiling point formed may then be recovered from the issuing vapors by fractional condensation or from the reaction mixture by distillation. A dark-colored residue is obtained as by-product during the cracking stage. It is also advantageous to treat the activated aluminium with hydrogen chloride during the heating-up of the vessel in which the aluminium is contained. The treatment with hydrogen chloride facilitates the commencement of the reaction.

The process of the present invention has the advantage that the splitting and subsequent condensation of hydrocarbons may be carried out with free halogen, especially chlorine obtained as waste product in many industrial chemical operations. The corresponding hydrogen halides hitherto employed, such as hydrogen chloride are usually much more expensive.

The extent of the halogenation is adjusted to the extent of the cracking desired. As may readily be comprehended, the extent of the halogenation is kept low if the initial materials are to be cracked only to a small degree, and allowed to become large if a strong cracking is intended, since the halogenation effected in this process is the necessary condition for cracking, and the extent of cracking is the greater the greater the extent of halogenation. The extent of halogenation may be varied by varying the temperature and the duration of treatment, and, similar to other halogenating processes and quite generally to other chemical reactions, the effect, i. e. the extent of halogenation is greater at higher temperatures and by a longer duration of treatment than at low temperatures and a short duration of treatment.

The hydrogen halides evolved during the halogenation in the first stage of the process are preferably wholly or partially reintroduced during the treatment with activated aluminium in the second stage, if desired with the addition of further amounts of hydrogen halide. The halogens may be employed alone or in admixture with each other in the first stage of the process. The duration and temperature of the treatment with halogen and also the amount of hydrogen halide obtained depend to a large extent on the nature of the initial materials. For example when a middle oil obtained from tar is employed the halogenation must be carried out under milder conditions than when employing a mineral oil if the deposition of resinous masses is to be prevented. In some cases it may be advantageous to treat only a part of the initial material with halogen, and then to expose this portion, together with untreated material which may be of the same or another origin, to the action of activated aluminium. The treatment with halogen may be carried out at temperatures of between about 0° and 150° C. and usually at room temperature or slightly elevated temperature. If desired, the treatment with halogen may be carried out in a vessel directly connected with the cracking chamber or in a part of the cracking vessel itself so that the hydrogen halide split off may pass directly into the cracking chamber. In this case the operation must be so conducted that the halogen is wholly or to the greater part used up so that no, or very little, halogen passes into the cracking chamber. This may be attained by allowing the hydrocarbons to remain for a long time in contact with the free halogen for example by providing for a low velocity of flow of the hydrocarbons or by causing the hydrocarbons to pass a long way while in contact with the free halogen. Thus in all cases the formation of split products containing halogen is avoided. The nature of the resulting products as regards their boiling curve, their degree of saturation and the like is dependent on the conditions of the halogenation and splitting. The aforesaid dark residues formed as by-products during the splitting may be worked up for example by low-temperature carbonization with an addition of basic substances according to the British Specification No. 320,891. The process may be carried out under any suitable pressure, but usually atmospheric pressure or moderately increased pressure will suffice.

The nature of the present invention will be further described with reference to the accompanying drawing showing diagrammatically in vertical section apparatus which are especially suitable for carrying out the process according to this invention. The invention is, however, not restricted to the specific arrangements shown in the drawing. In the apparatus shown in Figure 1 free halogen is introduced by way of pipe 1 into the hydrocarbon oil to be converted which is contained in a vessel 2 while a stirring device 3 provides for a thorough stirring of said hydrocarbons. The latter are then passed by way of pipe 5 into the cracking vessel 7 where they are subjected in the presence of activated aluminium and, if desired, of an inert gas, which may be supplied through the pipe 10, to the action of heat supplied by the oil bath 8. A stirring device 6 provides for an intensive stirring of the reaction mixture. In conjunction with the hydrocarbons from vessel 2, hydrocarbons which have not been treated with a halogen can be supplied to vessel 7 through pipe 11 controlled by valve 12. The hydrogen halide set free in vessel 2 is supplied by way of pipe 4 into the cracking vessel 7, or by proper manipulation of valves 14 and 15 in pipes 13 and 4 respectively, the hydrogen halide may be wholly or in part removed from the system. The products resulting from the cracking treatment in vessel 7 are withdrawn at 9.

Figure 2:
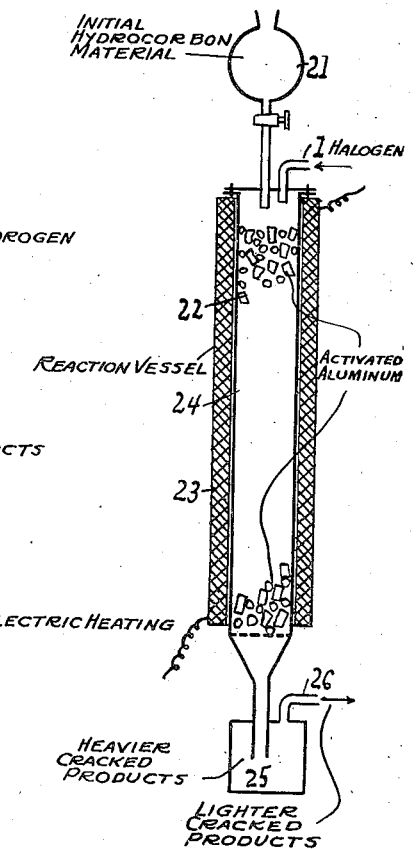

In Figure 2 numeral 21 denotes a reservoir from which initial hydrocarbon oil is supplied to the reaction vessel 24 which is filled with activated aluminium and which is heated by the electric heating device 23. The free halogen introduced at 1 is used up in the upper zone 22 of the vessel 24. The hydrogen halide and the halogenated hydrocarbons formed in the said zone pass into the lower and hotter parts of the vessel 24 where the dehalogenation and cracking take place. The resulting products pass into the vessel 25 where high boiling hydrocarbons are collected, and from thence by way of pipe 26 into a dephlegmator (not shown).

The following examples will further illustrate the nature of this invention, but the invention is not restricted to these examples. The percentages are by weight.

*Example 1*

Chlorine is led into paraffin oil (boiling above 350° C.) until an increase in weight of about 65 per cent has taken place and in this manner the whole becomes heated to about 100° C. and splitting off of hydrogen chloride takes place. The resulting product, which contains about 40 per cent of chlorine, is mixed with the same weight of untreated gas oil having a boiling point range of from 270° to 350° C. The mixture is led at 250° C. together with a current of nitrogen through a vessel which contains aluminium which has been activated with a solution of mercuric chloride and subsequently treated with hydrogen chloride during the heating up of the vessel. The action of the hydrogen chloride during the heating facilitates the commencement of the reaction. 80 per cent (calculated with reference to the oil free from chlorine employed) of a liquid product are formed of which 40 per cent boils up to 200° C. and a further 15 per cent up to 270° C. If, instead of nitrogen, the hydrogen chloride split off during the chlorination of the paraffin oil be led through the reaction vessel during the splitting, about the same amount of a liquid product is obtained of which about 55 per cent boils up to 200° C. and a further 23 per cent up to 270° C. The split products are free from chlorine after washing with soda.

*Example 2*

A middle oil arising from the destructive hydrogenation of coal and boiling mainly between 200° and 325° C. is treated for 30 minutes with chlorine while maintaining the temperature at 30° C., and in this manner about 20 per cent (calculated on the oil employed) of hydrogen chloride is formed. The resulting product, which contains about 30 per cent of chlorine, is led at 250° C., together with nitrogen, through a reaction vessel charged with rings of sheet aluminium activated with a solution of mercuric chloride. In this manner 73 per cent (calculated on initial material free from chlorine) of liquid products of which 65 per cent boils up to 200° C. and 2 per cent of condensate at the temperature of solid carbon dioxide are obtained. After washing with soda the cracked product is free from chlorine.

*Example 3*

A gas oil fraction having the boiling point range of from 270° to 350° C., which after the passage therethrough of a stream of nitrogen laden with bromine vapor contains 10 per cent of bromine, yields, when led over activated aluminium at 250° C. with a slow current of hydrogen chloride, 67 per cent (calculated on the initial material free from bromine) of liquid products of which 60 per cent distil up to 200° C. and a further 23 per cent up to 270° C. After washing with caustic soda or soda the cracked product is free from halogen.

*Example 4*

Paraffin oil is treated with chlorine until the reaction product contains 10 per cent of chlorine, and then it is heated while stirring. At 120° C. 5 per cent of activated aluminium in the form of chips are introduced and the whole is further heated while passing therethrough a part of the hydrogen chloride recovered during the chlorination. The cleavage product leaving the reaction chamber is dephlegmated. 56 per cent of constituents boiling from 50° to 200° C., 34 per cent of constituents boiling from 200° to 270° C., and 5 per cent of constituents which condense at 80° below zero centigrade are obtained, all of which are free from chlorine, after washing with soda.

*Example 5*

Gas oil is chlorinated and then led, together with the hydrochloric acid split off during the chlorination, over aluminium which has been pretreated as described in Example 1. If a product having a chlorine content of 14 per cent be employed, 78 per cent (calculated on the oil free from chlorine) of liquid products is obtained of which 79 per cent boils below 200° C. (corresponding to 63 per cent of benzine calculated on the initial oil). If the gas oil has a chlorine content of only 10 per cent, 82.5 per cent of liquid products are obtained, of which only 55 per cent boils below 200° C. (45 per cent of benzine calculated on the initial oil). When washed with soda the cracked products are free from chlorine.

The fact that by employing oils containing differently large amounts of chlorine, still greater differences as regards the boiling point ranges of the resulting products are obtained is shown from the following: A chlorinated gas oil containing 17 per cent of chlorine yields, when treated as described in this example, 12 per cent of products boiling below 0° C. and condensable at 50° below zero centigrade. A gas oil containing 22.5 per cent of chlorine yields 26 per cent of such products by the same treatment.

*Example 6*

Gas oil having a boiling point range of from 270° to 350° C. is introduced into a column and at the same time a stream of chlorine of 11 per cent calculated with reference to the oil is also led in so that the chlorine is able to react immediately with the oil. The reaction mixture is led at 220° C. over activated aluminium situated in the column. 71 per cent of a liquid product which is free from chlorine after washing with soda are obtained of which 41 per cent (calculated on the initial oil) boils below 200° and a further 13 per cent from 200° to 270° C.

What we claim is:—

1. The process for the conversion of hydrocarbons of high boiling point into those of lower boiling point which comprises subjecting the former to the action of free halogen at a temperature between 0° and 150° C., and then subjecting the products obtained at a temperature between 100° and 500° C. to the action of aluminium activated by treating it with a solution of a salt of a metal which is less electropositive than aluminium.

2. The process for the conversion of hydrocarbons of high boiling point into those of lower boiling point which comprises treating the former with free halogen at a temperature between 0° and 150° C., and then subjecting the products obtained at a temperature between 100° and 500° C. in the presence of a gas which does not take part in the conversion to the action of aluminium activated by treating it with a solution of a salt of a metal which is less electropositive than aluminium.

3. The process for the conversion of hydrocarbons of high boiling point into those of lower boiling point which comprises treating the former with free halogen at a temperature between 0° and 150° C., and then subjecting the products obtained at a temperature between 100° and 500° C. to the action of aluminium activated by treating it with a solution of a salt of a metal which is less electropositive than aluminium, and of at least part of the hydrogen halide formed during the treatment with free halogen.

4. The process for the conversion of hydrocarbons of high boiling point into those of lower boiling point which comprises treating the former with free chlorine at a temperature between 0° and 150° C., and then subjecting the products obtained at a temperature between 100° and 500° C. to the action of aluminium activated by treating it with a solution of a salt of a metal which is less electropositive than aluminium.

5. The process for the conversion of hydrocarbons of high boiling point into those of lower boiling point which comprises treating the former with free chlorine at a temperature between 0° and 150° C., and then subjecting the products obtained at a temperature between 100° and 500° C. to the action of aluminium activated by treating it with a solution of a salt of a metal which is less electropositive than aluminium, and of at least part of the hydrogen chloride formed during the treatment with free chlorine.

6. The process for the conversion of hydrocarbons of high boiling point into those of lower boiling point which comprises treating the former with free halogen at a temperature between 0° and 150° C., mixing the products thus obtained with liquid hydrocarbons not subjected to the action of halogen and then subjecting the resulting mixture at a temperature between 100° and 500° C. to the action of aluminium activated by treating it with a solution of a salt of a metal which is less electropositive than aluminium.

7. The process for the conversion of hydrocarbons of high boiling point into those of lower boiling point which comprises treating the former with free chlorine at a temperature between 0° and 150° C., and then subjecting the products obtained at a temperature between 100° and 500° C. in the presence of a gas which does not take part in the conversion to the action of aluminium activated by treating it with a solution of a salt of a metal which is less electropositive than aluminium.

8. The process for the conversion of hydrocarbons of high boiling point into those of lower boiling point which comprises treating the former with free chlorine at a temperature between 0° and 150° C., and then subjecting the products obtained at a temperature between 100° and 500° C. in the presence of nitrogen to the action of aluminium activated by treating it with a solution of a salt of a metal which is less electropositive than aluminium.

9. The process for the conversion of hydrocarbons of high boiling point into those of lower boiling point which comprises treating the former with free chlorine at a temperature between 0° and 150° C., and then subjecting the products obtained at a temperature between 100° and 500° C. to the action of aluminium activated by treating it with a solution of a salt of a metal which is less electropositive than aluminium and by subsequent treatment with hydrogen chloride.

10. The process for the conversion of hydrocarbons of high boiling point into those of lower boiling point which comprises treating the former with free chlorine at a temperature between 0° and 150° C., and then subjecting the products obtained at a temperature between 100° and 500° C. in the presence of nitrogen to the action of aluminium activated by treating it with a solution of a salt of a metal which is less electropositive than aluminium and by subsequent treatment with hydrogen chloride.

11. The process for the conversion of hydrocarbons of high boiling point into those of lower boiling point which comprises leading chlorine into paraffin oil until said paraffin oil becomes heated to about 100° C., mixing the product thus obtained with gas oil and leading the mixture at about 250° C. in the presence of nitrogen with aluminium which has been treated with a solution of mercuric chloride and subsequently treated with hydrogen chloride.

12. The process for the conversion of hydrocarbons of high boiling point into those of lower boiling point which comprises treating middle oil with chlorine at about 30° C. and leading the resulting product at about 250° C. over aluminium activated with a solution of mercuric chloride.

13. The process for the conversion of hydrocarbons of high boiling point into those of lower boiling point which comprises treating gas oil with chlorine and leading the resulting product at about 220° C. over aluminium activated with a solution of mercuric chloride.

HANS ENGEL.
JOSEF JANNEK.